United States Patent [19]

Ernst

[11] 4,011,346

[45] Mar. 8, 1977

[54] PROCESS FOR THE PRODUCTION OF A FORMED HIGH MOISTURE PET FOOD PRODUCT

[75] Inventor: Thomas J. Ernst, St. Louis, Mo.

[73] Assignee: Ralston Purina Company, St. Louis, Mo.

[22] Filed: Sept. 18, 1974

[21] Appl. No.: 504,795

[52] U.S. Cl. .............................. 426/104; 426/332; 426/335; 426/532; 426/646; 426/656; 426/802; 426/805
[51] Int. Cl.² ...................... A23B 4/12; A24B 4/14
[58] Field of Search .......... 426/324, 325, 326, 332, 426/335, 104, 532, 646, 656, 802, 805

[56] References Cited

UNITED STATES PATENTS

| | | | |
|---|---|---|---|
| 3,202,514 | 8/1965 | Burgess | 426/326 X |
| 3,736,148 | 5/1973 | Katz | 426/335 X |
| 3,810,764 | 5/1974 | Waggle | 426/802 X |

*Primary Examiner*—Joseph M. Golian
*Attorney, Agent, or Firm*—Virgil B. Hill

[57] ABSTRACT

A process for the production of a pet food product resembling a "cooked" hamburger patty is set forth, which has a moisture content exceeding about 40% by weight and is stabilized against bacterial and mycotic penetration comprising: grinding raw animal meat into particles of a substantially uniform size, heating the same and impregnating the meat with a preservative composition which comprises a mixture of a bacteriostatic agent and an edible antimycotic. A critically defined range of expanded protein pieces are added to the final product which is between about 25 to 90% by volume of the product. The addition of a critically defined percentage of the expanded protein pieces provides a realistic chunky appearance and gives the product a shear value which exceeds about .080 ft. lb./gram. The bacteriostatic agent is preferably an organic acid selected from the group consisting of succinic acid, pyruvic acid, fumaric acid, adipic acid, glucono-Δ-lactone, tartaric acid, lactic acid, citric acid, malic acid and mixtures thereof or an acid salt such as sodium hexametaphosphate and calcium acetate. The edible antimycotic is preferably a mixture of sorbic acid and salts thereof.

15 Claims, No Drawings

PROCESS FOR THE PRODUCTION OF A FORMED HIGH MOISTURE PET FOOD PRODUCT

BACKGROUND OF THE INVENTION

This invention relates to a unique high moisture pet food product which is preserved against bacterial and mycotic spoilage and a process for producing the same.

The pet food market has in recent times become segmented into three major categories based on the moisture content of the pet food. These being (1) dry pet foods or those having a moisture content generally below about 15% by weight, (2) intermediate or soft moist pet foods which have a moisture content generally of between 15 and 35% by weight, and (3) high moisture pet foods or those having a moisture content which exceed about 40% by weight. While commercial products in all of these categories have been quite successful, the dry and intermediate moisture pet foods have the distinct advantage over high moisture pet foods of being convenient to use by the consumer, and therefore, easy to feed to the animal. This advantage is provided in the case of dry foods, by the relatively low moisture content which does not require expensive packaging or special preservatives for storage of the product under ambient conditions. Intermediate moisture pet foods, on the other hand, are equally convenient but require the use of preservatives or special packaging since the moisture content is sufficient to support bacterial and mold growth. Both of these products, however, suffer the disadvantage over high moisture products of not being generally as palatable to the pet. Therefore, in spite of the tremendous advantages with regard to convenience that dry and intermediate moisture pet foods have to offer, they still have as a general deficiency, a somewhat lower level of acceptance by the animal as compared to the high moisture products.

As is apparent, however, the high moisture products, in spite of being more palatable, suffer from the need for expensive packaging and processes employing sterilization because the high moisture level provides a virulent media for the growth of microorganisms. High moisture pet foods of the prior art has heretofore been limited to a single type of product which is packaged in a can and has been cooked and sterilized to provide the product with an acceptable shelf life. On the other hand, after the product is opened, it rapidly spoils without refrigeration, and apportioned feeding of the product to the pet is very difficult. A need has, therefore, been recognized for a high moisture pet food product which has the palatability of the canned products with the storage and packaging requirements of a dry or intermediate moisture product, but with the aesthetic appeal of a cooked piece of meat.

Intermediate moisture pet foods which have a lower moisture content of between about 15 to 35% by weight generally have been dependent on a reduction in the water activity of the product to prevent substantial bacterial growth. The addition of an antimycotic has also been required to inhibit mold growth. Typical intermediate moisture pet foods having a reduced water activity are disclosed in U.S. Pat. Nos. 3,202,514, 3,482,985, 3,615,652 and 3,653,908. These have generally involved the addition of water soluble solids such as sugar or reduced polysaccharides to reduce the water activity to an acceptable level to prevent bacterial propagation. Sugar and water soluble solids of this type are, however, entirely unusable in stabilizing high moisture pet foods since they cannot reduce the water activity to a low enough level to prevent bacterial growth to any extent.

Aside from the problems of preservation associated with high moisture pet foods, aesthetic appeal of the product is also extremely important assuming it is preserved against bacterial and mycotic penetration, since the mushy appearing mixture of meat and cereal grains normally associated with canned products is not the most appealing and convenient to feed. In this respect, the intermediate moisture products have a coherent nature, yet are soft and moist in texture to a sufficient degree to have a desirable appearance, and therefore have a high degree of aesthetic appeal to the consumer. It would, therefore, be highly desirable to provide a high moisture pet food which is bacteriologically stable and can be easily packaged and stored under ambient conditions, yet have the aesthetic appeal and convenience of an intermediate moisture pet food.

The present invention, therefore, provides a solution to this need by providing a unique high moisture pet food which by appearance resembles a freshly cooked "patty" of hamburger yet is completely preserved against bacterial and mycotic penetration. Furthermore, this product is formed by a process which gives the product maximum aesthetic appeal, in that it can be broken apart by hand for apportioned feeding to the pet and upon breaking, has a "chunky" meat appearance rather than the mushy homogeneous, appearance one would expect from combining the diverse ingredients of the present invention including cooked meat, water and preservative. This desirable chunky appearance is characterized by the product having a shear value above about .080 ft. lb./gram as compared to a mushy homogeneous ground product of nearly identical ingredients which has a shear value below this.

SUMMARY OF THE INVENTION

In considering the production of a high moisture pet food product which resembles a hamburger patty in appearance, a major area of concern was how the product could be given a firm "chunky" meat-like texture using meat that had been cooked since formed products made from cooked meat typically have poor structural integrity without the addition of high levels of binder or adhesive, which if added would detract from the natural meat appearance of the product. This problem was obviated in the present invention by the addition of a critically defined range of expanded protein material derived from vegetable protein or a mixture of meat and vegetable protein, with the latter being preferred to serve as a medium for the cooked meat particles and provide a coherent structure for the hamburger-like patty giving it a chunky, natural appearance. In a manner of speaking, the expanded protein fiber chunks can be characterized as providing a "bulking" effect for the formed product in that it provides a medium which gives the resultant product a chunky rather than a homogeneous, mushy appearance. In this regard, if only the meat particles were employed or if too low of a percentage of expanded protein pieces were added, even with a binder or adhesive, the product would appear extremely unnatural after forming since a molding or forming operation would compress the meat particles into a substantially homogeneous uniform structure. By the same token, if too high a percentage of expanded protein chunks are added, the product would be too "crumbly" and would easily fall apart with handling. On the other hand, a critically defined range of addition of expanded protein pieces provides additional volume and bulk for the product and the meat particles can coalesce around these fibrous pieces to give the product a "chunky" effect. In this respect, the expanded protein fibers are somewhat resilient to thereby improve resistance of the product to compressive forces. The expanded protein pieces also provide a "breaking" point for the formed product giving it a "chunky" appearance when the product is broken apart. The expanded protein material can be produced by a number of processing techniques as set forth in U.S. Pat. Nos. 3,496,858, 3,488,770, 3,662,673, 3,759,715 and 3,810,764 herein incorporated by reference and which generally relate to expanded protein fibers composed substantially of vegetable protein whereas U.S. application Ser. No. 378,490 filed July 12, 1973 herein incorporated by reference relates to fibers composed of both meat and a vegetable protein material. The fibers are added to the cooked meat particles in a critically defined amount of between about 25% to 90% by volume of the final product to obtain the "chunky" meat-like product which has a shear value of at least about 0.080 ft. lb./gram. At this range of addition, the cooked natural meat particles coalesce around the expanded protein pieces which provide the chunky natural appearance for the product. It is preferred to rehydrate the expanded protein pieces in an aqueous medium prior to mixing with the cooked meat particles since the expanded pieces readily rehydrate without disintegration and the "wet" protein fibers provide an acceptable surface for adherence of the cooked meat particles thereby giving the product a coherent structure.

While the use of expanded protein fibers or pieces in the indicated amount substantially improved the appearance and texture of the product, the addition of preservatives are, of course, required to effectively stabilize the product against bacterial and mycotic penetration. In the instant situation, if substantially neutral preservatives such as acid salts, for example, calcium acetate and sodium hexametaphosphate are added to provide bacterial stability, no other problems are encountered with the addition of the expanded protein pieces and special treatment of protein fibers are unnecessary. On the other hand, even in this situation, the protein pieces must be added within the critically defined range of 25 to 90% by volume to provide a product with a shear value of at least about 0.080 ft. lb./gram.

In the present invention, however, the pet food of the instant invention is preferably stabilized by the addition of an effective amount of an acid preservative preferably an organic acid selected from the group consisting of succinic acid, pyruvic acid, fumaric acid, adipic acid, glucono-Δ-lactone, tartaric acid, lactic acid, citric acid, malic acid and mixtures of these acids together with an edible antimycotic. It was determined that if acid preservatives of the above type which are organic acids, were added to the mixture of rehydrated fibers and cooked meat particles in an amount sufficient to preserve the mixture and mixed that the fibers tended to disintegrate in the acid medium. This had the undesirable result of completely altering the texture of the product, even within the critical range of addition of expanded protein pieces, to a uniform, homogeneous pasty appearance, analogous to that of mashed potatoes, rather than the firm chunky meat-like appearance desired.

Unexpectedly, in this type of situation it was determined that if the protein mixture prior to expansion of the same to produce the expanded protein fiber was adjusted to a pH of about 4.6 to 6.2, the problem with fiber disintegration was overcome. A preferred method of reducing the pH of the protein mixture prior to expansion is, therefore, to add an aliquot portion of the total amount of organic acid preservative needed to thereby stabilize the expanded protein piece against acid disintegration. The fibers, containing a portion of the acid preservative needed to stabilize the final product, were then themselves stabilized against bacterial and mycotic penetration and they could be stored in a moist condition, rather than being subjected to a drying step after the expansion process. This, of course, has the advantage of providing more flexibility in the process and reducing the cost of the product. The most significant improvement, however, was with the fibers or expanded protein pieces themselves which no longer disintegrated when the remaining portion of the organic acid preservative was added and mixed with the cooked meat and fibers. Therefore, the resultant product with the fibers serving as a medium for the cooked meat particles had a firm meaty appearance resembling a hamburger patty, as characterized by the product having a shear value above about 0.080 ft. lb./gram.

In the preferred embodiment, mentioned above, the cooked meat particles are separately impregnated with an aliquot of the total amount of preservative needed as well as the aliquot which is incorporated in the expanded protein piece. This also provides an advantage in that more uniform distribution of the preservative composition is obtained throughout the entire product.

The present invention therefore comprises a process for the production of a pet food product having a moisture content exceeding about 40%, which is bacteriologically stable and protected against mold propagation, with a chunky natural meat texture comprising; grinding raw animal meat into particles of a substantially uniform size, heating the meat pieces to a temperature sufficient to pasteurize the meat and reduce the bacterial contamination thereof; followed by impregnation of the meat pieces with an aliquot of an amount of a preservative composition which is effective to inhibit bacterial and mycotic propagation in the pet food product said preservative composition comprising a mixture of an edible antimycotic, preferably sorbic acid, salts of sorbic acid and mixtures thereof, and an acid preservative preferably an organic acid selected from the group consisting of succinic acid, pyruvic acid, fumaric acid, adipic acid, glucono-Δ-lactone, tartaric acid, lactic acid, citric acid, malic acid, and mixtures of these acids. Alternatively, the expanded protein piece can be formed without the preservative composition if any acid is used to subject the pH of the protein starting material to about 4.6 to 6.2 prior to expansion. In this alternative to the preferred process, the entire amount of the preservative composition is added either to the cooked meat slurry or to the aqueous medium used to rehydrate the resultant expanded protein pieces as hereinafter described to thereby effectively stabilize the formed food product against bacterial or mycotic penetration.

DESCRIPTION OF THE PREFERRED EMBODIMENTS

The present process for the production of a formed pet food product having a moisture content exceeding about 40%, a shear value of at least about 0.080 ft. lb./gram, and stabilized against bacterial and mycotic penetration comprises as the initial step the selection and formulation of animal protein sources such as raw animal tissue. Natural meats such as poultry, fish or animal meats and meat by-products having the requisite quality, ingredient cost and palatability are first selected and formulated. Depending on the flavor or palatability to be imparted to the formed food product, the meat or meat by-product may be selected from a wide range of components to permit the processor a wide range of flexibility in selecting the natural meat components to be used in the present product. Typical meat products which may be used include beef carcass, tissue, beef gullets, beef cheek trimmings, beef heart tissue, beef liver, beef lungs, beef melts, pork liver and other types of pork tissue and whole ground chicken. It will be understood that the other meat sources may be employed if desired.

The meat types which are selected and formulated to provide flavor for the present product are according to the method of the present invention maintained in either a chilled or forzen condition which may be from a temperature ranging from about $-20°$ F. to $40°$ F. with a preferred temperature of about $28°$ F. The meat selected for use in thawed or frozen condition is then passed through a meat grinder equipped with about a ⅜ inch – ⅝ inch grinding plate to reduce the meat into pieces of a substantially uniform size. The size of about ⅜ inch to ⅝ inch for the ground meat particles of the present invention is preferred with the method of the present invention, but it will be understood that satisfactory results may be obtained by grinding the meat to a particle size ranging from ⅛ inch to 1 inch depending on the type of product preferred.

The ground meat particles are then conveyed to a cooking apparatus and the ground meat particles are cooked with slow agitation to a temperature in excess of about $135°$ –$140°$ F. for a period of time between about 10 and 15 minutes. The actual cooking or heating time of this step should not be considered critical in the practice of the present invention, and may be at any temperature above this and for whatever period of time is convenient and efficient to use.

After the mixture is heated to the desired temperature, a number of dry ingredients are added to the cooked or heated meat material to effect nutritional balance, as well as other additives which are used in the food product including gums, sugar, etc. Typical materials added at this stage include minerals and vitamins, and possibly crystalline or powdered additives including antimycotics such as potassium sorbate and sorbic acid. These materials may be added in effective amounts needed for nutritional purposes as well as mycotic stability. Typical percentages of the preferred antimycotics in the final product such as sorbic acid, potassium sorbate, and mixtures thereof is between about 0.15 to 0.3% sorbic acid and 0.15 to 0.3% potassium sorbate. Other edible antimycotics such as salts of benzoic and propionic acid are highly effective and may be satisfactorily employed in the present process to provide mycotic stability. After these dry ingredients are added to the heated meat mixture maintained at a temperature above about $135°$ –$140°$ F., mixing and heating continues for a short period of time and then the temperature of the mixture is elevated to a temperature of about $165°$ to $175°$ F.

Elevation of the temperature to this range is carried out to effectively pasteurize the meat mixture and reduce the initial bacterial contamination of the mixture prior to treatment with the preservative system. With the initial bacterial level of the product having been reduced to an acceptable level by this initial heating step, bacterial stability can then be provided by the addition of a preservative system after an initial reduction in bacterial count to provide an acceptable storage life. If desired, the dry ingredients previously noted can be added at this stage as opposed to adding them prior to pasteurization and the particular order of addition of the dry ingredients in the process is not considered to be limiting.

Following pasteurization of the heated or cooked meat mixture, the temperature is reduced to about $110°$ to $120°$ F. prior to addition of either an aliquot portion of the preservative composition, or the total amount of preservative which includes both a bacteriostatic agent and an antimycotic. Although the antimycotic can be added prior to pasteurization, it could also be added after cooking at the same time as the bacterial stabilizing agent and the present invention is not limited with regard to the order of addition of the ingredients of the present food product. In the instant invention, if a substantially neutral preservative is added, then acid stabilization of the expanded protein pieces to prevent disintegration is not needed, since a satisfactory chunky product is obtained with the addition of the minimum level of expanded protein pieces. This would be the case if preservatives such as acid salts selected from the group consisting of calcium acetate and sodium hexamethaphosphate are employed. In this event, the expanded protein pieces may be employed without acid stabilization to provide the desired textural properties in the product and the total amount of acid salt needed to effect bacteriological stability can be added to the cooked meat mixture prior to the addition of the expanded protein pieces.

It is preferred, however, in the instant invention, that the preservative composition employed to provide bacterial and mycotic stability comprises an organic acid preservative selected from the group consisting of organic acids such as succinic acid, pyruvic acid, fumaric acid, adipic acid, glucono-Δ-lactone, tartaric acid, lactic acid, citric acid, malic acid and mixtures thereof. An edible antimycotic is also included in the instant preservative system to provide mycotic stability to the product and the particular antimycotic employed can be selected from a wide variety of materials suitable for this purpose, although sorbic acid, salts or sorbic acid and mixtures thereof are preferred. Other antimycotics can be employed provided that they afford mycotic stability for a product such as that characterized in the instant invention having a moisture content about 40% by weight, and do not alter the palatability or textural characteristics of the resultant product.

The preferred preservative composition employed in the present inventon which consists of an organic acid preservative and an edible antimycotic is added to the product in an amount effective to inhibit bacterial and mycotic propagation in the pet food product, with typical percentages of the organic acid being in the amount of between 0.5 and 3% by weight of the product and typical amounts of the antimycotic being in the amount of between about 0.15 to 0.3% by weight of the product. The exact amount employed, of course, is entirely dependent on the specific product, moisture content, as well as the temperature and conditions under which the product is stored.

At this stage of the process it is preferred that only an aliquot portion of the preservative composition is added to the meat mixture after cooking, since the balance of the preservative composition is added together with the expanded protein pieces since this provides a means for avoiding the associated textural problems with the product when an expanded protein product is added which has not been acid stabilized. In this regard, it is preferred to add an aliquot portion of the preservative composition to the meat mixture and the balance to the starting material of the expanded protein fiber prior to its production. In this manner, a more uniform and consistent distribution of preservative is obtained in the primary components of the instant product, i.e. the cooked meat particles and the expanded protein pieces. The exact aliquot of the preservative composition which should be added to the meat mixture at this stage is not in any manner limiting, since the aliquot portion added at this stage is controlled primarily by the amount of the preservative composition which needs to be added to the starting material for the expanded protein piece in order to control its pH to about 4.6 to 6.2 prior to formation, since it has been determined that if this is accomplished, the fiber is acid stable and will not readily disintegrate in an acidic environment. Therefore, it may be said that the exact aliquot percentage added to the meat mixture is controlled only in this respect, although typically the amount added will be between about 10 to 90% by weight of the total amount of preservative composition needed in the resultant product. Following the addition of the described aliquot portion of the preservative composition, mixing is carried out to provide uniform distribution of the preservative composition. As previously noted, however, the total amount of preservative needed to stabilize the formed food product against bacterial and mycotic penetration can be added to the cooked meat mixture as opposed to the addition of only an aliquot portion. In this situation, an acid of any type as opposed to those usually employed as a bacteriostat in the present invention, is used to adjust the pH of the protein material prior to expansion to between about 4.6 to 6.2 and thereby provide the expanded protein piece with the desired degree of acid stability and resistance to disintegration in the formed meat product of the present invention containing the organic acid preservative. If neutral preservatives are employed such as calcium acetate and sodium hexamethaphosphate, acid stabilization of the expanded protein pieces becomes unnecessary and hence the total amount of the acid salt preservatives may be added to the cooked meat mixture at this stage.

The expanded protein material which is combined with the cooked meat-preservative composition in a critically defined percentage to yield a product with the requisite shear value or textural characteristics can be produced by a variety of processing techniques as set forth in U.S. Pat. Nos. 3,496,858; 3,488,770; 3,662,673; 3,759,715 and 3,810,764 which generally relate to expanded protein fibers composed substantially of vegetable protein whereas U.S. application Ser. No. 378,490 filed July 12, 1973 now abandoned which relates to fibers composed of both meat and a vegetable protein material. The present invention is not intended to be limited by the specific process employed to produce the expanded protein pieces or fibers employed in the instant product and they are added to the cooked meat particles in an amount of between about 25% to 90% by volume of the final product to obtain the "chunky" meat-like product which has a shear value of at least about .080 ft. lb./gram. At this range of addition, the cooked natural meat particles coalesce around the expanded protein pieces which provide the natural chunky appearance for the product.

If an organic acid preservative is used, the expanded protein pieces will tend to disintegrate in the acidic environment of the acid stabilized product during subsequent blending into the meat mixture with the organic acid preservative unless the protein pieces are effectively acid stabilized. In this regard, it has been determined that if the pH of the starting material, i.e. the material fed into the extruder or the dough prior to expansion, is reduced to about 4.6 to 6.2 prior to expansion, acid stability and hence resistance to deterioration in an acidic environment is improved. The exact means of reducing the pH can be achieved by the addition of any acid to the material prior to expansion and the present invention is not intended to be limited by the specific means for pH adjustment. It is, however, preferred in the present process to include an aliquot portion of the preservative composition which preferably comprises an organic acid and an antimycotic to adjust the pH of the proteinaceous material prior to expansion. This also achieves the very desirable result of uniformly impregnating the expanded protein piece with the preservative composition to thereby provide a more uniform distribution of the preservative through at the primary matrices of the present product, i.e. the cooked meat particles and the expanded protein pieces.

Prior to addition of the expanded protein pieces to the cooked meat mixture, it is preferred in the instant invention, to hydrate the fibers with water since they more readily mix with the meat material if they are hydrated prior to addition and they further have a more meat-like texture since they swell in size upon hydration with water. The expanded protein pieces or fibers therefore can be moistened with water, preferably hot water, which is heated to a temperature of about 180° F., or with a weak solution of an acid such as phosphoric acid. The fibers or expanded protein pieces are hydrated for at least about 15 minutes, although the minimum time can vary depending on the temperature of the water, and the relative weight of fibers or water. The exact time for rehydration should therefore not be considered limiting in the instant invention. If desired, an aliquot portion of the preservative composition needed in the formed food product, can be added to the water solution and used to rehydrate the fibers if desired, if it is deemed desirable to omit the addition of an aliquot portion of the preservative during formation of the expanded product. This has the same desirable advantage as adding the preservative prior to expansion since the expanded protein pieces prior to addition to the cooked meat mixture, are uniformly impregnated with preservatives. The wet fibers can therefore be stored without refrigeration or controlled storage conditions prior to addition to the meat mixture. This has the advantage of providing more flexibility in the instant process.

After rehydration, the expanded protein fibers or pieces are preferably ground to a substantially uniform size or to a size which is in the range of the meat particles or ⅜ - ⅝ inch in size. They are then added to the cooked meat mixture and agitated at a temperature of about 120° F. for at least about 10 minutes. As previously noted, relative to obtaining the chunky, nonhomogeneous, texture desired for the instant product, as characterized by the product having a shear value of at least about 0.080 ft. lb./gram, it is preferred that the expanded protein pieces be added at a level of between about 25% to 90% by volume of the product. At this range of addition, and after forming of the product the expanded protein pieces become the primary determinative factor in the texture of the product and in this respect add volume of "bulk" to the formed meat product, thereby increasing the shear value of the product to at least about 0.080 ft. lb./gram.

The ability of the formed product to withstand a measured amount of work or compressive force can be correlated with the desirable chunky texture provided by the critical volume of expanded protein pieces together with acid stabilization thereof in the event an organic acid preservative is employed. The lower the percentage of expanded protein pieces or in the event these pieces disintegrate in the acid environment of the product the easier the product will "mash" responsive to a measured amount of work or force which is applied and have a more uniform texture. The higher the level of expanded protein pieces the more resistant the product is to a measured amount of work or compressive force applied because of the resilient nature of the expanded protein pieces and the non-uniform chunky texture of the product.

In this regard, the term "shear value" as it is intended to apply to the desirable characteristics of the product of the instant invention, refers to the total amount of work applied in foot pounds per gram of product to force a sample of the product through a test cell such as a Kramer Shear cell. The Kramer Shear cell has been widely used as a means of evaluating the texture of food products and consists of a series of bars which travel through the sample mass and extended through slits in the bottom of the sample container, thereby providing a combination of shearing and compressive forces as the sample, responsive to a given amount of work or force applied with a machine such as an Instrom Universal Test Machine. If the machine is connected to a recorder to provide a graphical representation of the total force of work as defined by the area of the curves then the total amount of work defined in the present application as "shear value" to force the sample through the cage of the test cell can be calculated by the formula $$\text{Shear value (foot pound/gram)} = \frac{A \times B}{S}$$

Wherein A = area of the curve which defines the total force or work applied to the sample to force it through the test cell, B = the pounds of force per a given unit of area, and S = weight of the test sample.

The force needed to shear the product can be correlated to the meat-like, resiliency of the product, and natural chewiness of formed meat products. The Kramer Shear cell and its use has been described in numerous publications, in combination with an Instron tester examples of which are Szczesniak et al *Journal of Texture Studies* 1 p. 356 – 378 (1970); Voisey *Journal of Texture Studies* 2 p. 129 – 195 (1971); Kramer et al *Journal of The American Society for Horticultural Science* Vol. 61, p, 417 – 425 (1953); and Kramer *The Food Scientist* Vol. 5, p. 7 – 16 (1961).

In the present invention, the addition of a critically defined range of expanded protein pieces by volume of the formed product provides the product with a shear value of at least about 0.080 ft. lb./gram. This value is characterized as comprising the total amount of force or work, relative to a constant weight of the sample needed for forcing of the product through a Kramer Shear cell, which as noted may be a combination of one or more forces including compression and extrusion. If the expanded protein pieces are omitted from the instant product or are employed in an amount below the minimum level, the cooked meat particles themselves have a shear value less than that of the product containing the expanded protein pieces, at the minimum level. Furthermore, if expanded protein pieces are added which are not acid stabilized with an acidic preservative, they further disintegrate during agitation with the cooked meat particles thereby also reducing the shear value substantially below that of the desired meat-like product of the present invention.

The expanded protein pieces provide what might be termed a "bulking" effect for the cooked meat particles, by providing sites or matrices in the formed product which the meat particles can coagulate or adhere to. Because of this the expanded protein pieces become the "points" of breakage or shear when the product is broken and the resultant product for this reason has a distinguishable, highly desirable chunky appearance which can be broken in to distinguishable portions but is not mushy or crumbly in texture. This effect is characterized by the higher shear value in which the expanded protein pieces are present at a level sufficient to provide the predominant resistance to shear and hence be the primary contributing factor to the meat-like texture of the product.

After the addition of the rehydrated, expanded protein pieces the mixture of cooked meat and expanded protein pieces is thoroughly mixed or agitated and the mixture is then formed into a food product such as a "hamburger" patty or the like. The present inventon is not intended to be limited by the specific means of forming the product of the instant invention or by the shape or characteristics of the formed product. These may be varied depending on the type of product desired, and the present process relating to the production or forming of a patty is intended to be only typical of the types or shapes into which the product may be formed. The mixture may, therefore, be conveyed to a patty molder or similar apparatus used for forming a product resembling a hamburger patty. This apparatus permits the introduction of portions of the mixture into a mold or die where it is subjected to forming pressure to form a shape resembling a patty. A typical apparatus for this purpose is a Patty molder Model No. 150 manufactured by Bridge Machine Co., Palmyra, New Jersey.

After formation of the product, further treatment may be carried out if desired to further brown the product or give it "grill" marks, resembling the type of effect one would obtain if the product were cooked on an open fire over a grill. The present invention is not intended to be limited, however, by this step since this is done entirely to improve aesthetic appeal of the product and does not relate to the unique textural properties of the instant process. The resultant formed product is then packaged in a simple wrap type of package of either paper or polymer fiber. In this regard, polypropylene, foil wrap, and polymerized chloride have proven satisfactory as packaging materials. Products wrapped in these materials have exhibited a longer shelf life even when stored under ambient temperatures or higher.

The following Examples are intended to describe illustrative but non-limiting specific embodiments of the present invention.

EXAMPLE 1

Forty pounds of beef, and 21 pounds of beef by-products were passed through a grinder equipped with a ⅝ inch plate, and 20 pounds of whole chicken were ground in a semi-frozen state of about 28° F. through a grinder equipped with a ⅜ inch plate to provide pieces of a substantially uniform size. The ground meat particles are conveyed to a Ross Double Planetary Mixer, where they are slowly agitated to a temperature of 135° F. The temperature is maintained for 13 minutes, after which 0.5% by weight of vitamins and minerals are added, 2% by weight of animal fat, and 0.24% of both sorbic acid and potassium sorbate.

After addition of the above ingredients, the temperature of the mixture was raised to 175° F. for 9 minutes and mixed. While the mixture was maintained at 175° F., 5% by weight of sugar and 0.5% by weight of vegetable gum were added and mixed. The mixture was maintained at 175° F., for an additional 10 minutes, and was thereafter permitted to cool for an additional 13 minutes to a temperature of 125° F.

After the mixture has cooled to the desired temperature, 1.4% by weight of succinic acid was added to the mixture, together with .006% of Vitamin A & E oil, and 2% by weight of lecithin. The mixture was thoroughly mixed for a period of 5 minutes. An expanded protein piece or fiber is then separately produced by first combining the following ingredients in the indicated proportions by weight:

| Ingredient | Weight % |
| --- | --- |
| Meat and Bone Meal | 35 |
| Soybean Meal (50% protein) | 42.5 |
| Soy Protein Isolate (95% protein) | 21 |
| Sulfur | 0.2 |
| Brown Dye | 0.2 |

The ingredients were thoroughly mixed in a wet mixer to a moisture content of 39% by weight, and 0.5% by weight of succinic acid, 0.3% sorbic acid, and 0.3% potassium sorbate. The pH of the protein mixture was at this point at about 5.1. The moistened protein material was conveyed to an extruder and extruded under conditions of elevated pressure at a temperature above 212° F. to produce an expanded protein product. The expanded protein pieces were then dried to a moisture content of about 12% by weight prior to use. Prior to addition to the impregnated, ground meat mixture, the expanded protein pieces are hydrated by combining 412 pounds of expanded protein pieces with 480 pounds of water at a temperature of 180° F. and 20 pounds of 70% phosphoric acid. The mixture is agitated for 15 minutes, and the hydrated fibers are ground through a ⅜ inch plate, to a substantially uniform size.

22.2% by weight (79% by volume) of the ground, wet expanded protein pieces are added to the impregnated, ground meat mixture and mixed for 20 minutes. Following this, the mixture was formed on a patty forming machine into hamburger-like patties approximately 3 inch in diameter and ¾ inch thick. The formed patties were passed beneath an open flame which charred the surface of the patties to impart a charcoal broiled appearance. After this the formed patty was determined to have a natural, meat-like chunky texture. The patty could be easily broken apart for apportioned feeding.

EXAMPLE 2

Forty pounds of beef and 21 pounds of beef by-products were passed through a grinder equipped with a ⅝ inch plate and 20 pounds of whole chicken were ground in a semi-frozen state of about 28° F. through a grinder equipped with a ⅜ inch plate to provide pieces of a substantially uniform size. The ground meat particles are conveyed to a Ross Double Planetary Mixer, where they are slowly agitated and heated with steam to a temperature of 145° F. The temperature is maintained for 12 minutes after which 0.5% by weight of vitamins and minerals are added, 2% of animal fat and 0.24% of both sorbic acid and potassium sorbate.

After addition of the above named ingredients, the temperature of the mixture was raised to 175° F. for 8 minutes and mixed. While the mixture is maintained at 175°–180° F. for an additional 10 minutes, 5% by weight of sugar and 0.5% by weight of vegetable gum were added and mixed. Following this the mixture was permitted to cool for an additional 13 minutes to a temperature of 125°–130° F.

After the mixture is cooled to the desired temperature, 1% by weight of calcium acetate was added to the mixture together with 0.006% of Vitamin A & E oil, and 2% by weight of lecithin. The mixture was then thoroughly mixed for an additional period of 5 minutes.

An expanded protein piece or fiber is then separately produced by first combining the following ingredients in the indicated proportions by weight.

| Ingredients | Weight % |
| --- | --- |
| Meat and Bone Meal | 35 |
| Soybean Meal (50% protein) | 43.0 |
| Soy Protein Isolate (95% protein) | 21 |
| Sulfur | 0.2 |
| Brown Dye | 0.2 |
| Potassium Sorbate | 0.3 |
| Sorbic Acid | 0.3 |

The ingredients were then thoroughly mixed in the presence of steam and moisture to adjust the moisture content to about 39% by weight. The moistened protein material had a pH of about 5.8, and was conveyed to an extruder, and extruded under conditions of elevated pressure at a temperature above about 212° F. to produce an expanded protein product. The expanded protein pieces were then dried to a moisture content of about 12% by weight prior to use. Prior to addition to the impregnated, ground meat mixture, the expanded protein pieces were hydrated by combining 412 pounds of the expanded protein pieces with 480 pounds of water heated to a temperature of 180° F. and 20 pounds of 70% phosphoric acid. The mixture is agitated for 15 minutes and the hydrated fibers are ground through a ⅜ inch plate to a substantially uniform size.

22.6% by weight (79% by volume) of the ground wet, expanded protein pieces are added to the impregnated ground meat mixture and mixed for 20 minutes. Following this the mixture was formed on a patty forming machine into hamburger-like patties approximately 3 inch in diameter and ¾ inch thick. The formed patties were passed beneath an open flame which charred the surface of the patties to impart a charcoal broiled appearance.

EXAMPLE 3

To illustrate the importance of the critically defined range of addition of expanded protein pieces, a series of formed food products resembling hamburger patties, were prepared pursuant to Example 1 containing the following percentages by volume of the expanded protein pieces of Example 1.

| Sample | % by Volume of Product |
|---|---|
| 1 | 32 |
| 2 | 54 |
| 3 | 69 |
| 4 | 79 |
| 5 | 91 |

A control sample containing no expanded protein pieces but using only cooked meat produced pursuant to Example 1 was also evaluated.

The formed food products were placed in a Kramer shear cell and subjected to compressive and shearing forces with an Instron Universal Test machine. The machine was connected to a recorder and the total amount of force or work used to force the sample through the cage of the test cell was measured, this was designated as the "shear value" for each sample. The total force or work applied was divided by the weight of the sample to calculate the shear value in foot pounds per gram of product. The results obtained were as follows:

| Sample No. | % by volume Expanded Protein Pieces | Shear Value (ft. lb./gram) |
|---|---|---|
| 1 | 32 | .109 |
| 2 | 54 | .099 |
| 3 | 69 | .125 |
| 4 | 79 | .154 |
| 5 | 91 | .191 |
| Control | 0 | .061 |

The noted products were inspected visually and the all meat control was determined to have an undesirable homogeneous mushy texture, whereas the products produced pursuant to the instant invention has a "chunky" meat like appearance, and broke apart easily. It may further be seen from the above "shear values" that if expanded protein pieces are added to the product in the indicated amounts that "shear values" are obtained which are much higher than the all meat product and the "shear values" readily correlate with the amount of expanded protein pieces added on a volume basis. The desirable chunky texture as well as the desired shear value can therefore be readily correlated with the percentage by volume of expanded protein pieces.

EXAMPLE 4

To illustrate the importance of the addition the prescribed percentage of expanded protein pieces or fibers together with the need for acid stabilization of the expanded protein pieces in order to obtain a "chunky" texture if an acid preservative is employed to provide the formed product with a shear value of at least about 0.080 ft. lb./gram, three samples of product produced pursuant to Example 1 were subjected to a uniform application of force in a Kramer shear cell with an Instron Universal Test machine. The machine was connected to a recorder and the total amount of force or work used to force the sample through the cage of the test cell was measured and designated as the "shear value" for each sample. The total force or work applied was divided by the weight of the sample to calculate the shear value in foot pounds per gram of product and the shear value was averaged for the three samples. The average "shear value" obtained for the three samples was 0.151 foot lbs. per gram of product. These products, of course, contained at least the minimum level of addition of expanded protein pieces which were also acid stabilized to prevent disintegration in the acid preservative matrix employed in Example 1. These two factors, therefore, provides the product with a chunky meat-like appearance as characterized by the noted shear value.

To illustrate, the criticality of adjusting the pH of expanded protein material prior to expansion in order to impart acid stability thereto, a comparative test was performed wherein a product was formulated and produced by the process of Example 1, with the exception that the expanded protein pieces were not acid stabilized to prevent disintegration in an organic acid preservative, and were made entirely from soy protein and the entire amount of preservative was added to the meat prior to the addition of the protein pieces. Therefore, the expanded protein pieces wer produced by extrusion but without adjustment of the pH of the mixture prior to expansion. The unstabilized pieces were added to the product in an amount of 40% by volume of the product. Three samples of the product produced in this manner were subjected to forces in a Kramer shear cell with an Instron test machine and the total amount of force or work used to force the sample through the cage of the test cell was measured, which was designated as the "shear value" for each sample. The total force or work applied was divided by the weight of the sample to calculate the shear value in foot pounds per gram of product and the shear value was averaged for these three samples. The average "shear value" obtained for the three samples was .055 foot lbs. per gram of product. The product was further observed to have a mushy, homogeneous appearance rather than the chunky meat-like appearance described. The mushy appearance is therefore readily characterized by the low "shear value" and is readily traceable to the disintegration of the non-acid stabilized expanded protein pieces in the acid preservative used for the formed food product.

Although the present invention has been described with regard to various specific embodiments, it is understood that certain modifications and variations may be made without departing from the scope of the instant invention. Furthermore, such reasonable variations and modifications are considered to be within the spirit and scope of the Claims appended hereto.

What is claimed is:

1. A process for the production of a formed pet food product having a moisture content exceeding about 40% with a shear value of at least about .080 ft. lb./gram and stabilized against bacterial and mycotic penetration comprising:
   a. grinding raw animal meat into particles of a substantially uniform size;
   b. heating the ground raw meat to a temperature sufficient to pasteurize the meat and reduce the bacterial contamination thereof;
   c. impregnating the heated meat particles with a preservative composition in an amount effective to inhibit bacterial and mycotic penetration in the pet food product, said preservative composition comprising a mixture of a material selected from the group consisting of succinic acid, pyruvic acid, fumaric acid, adipic acid, glucono-Δ-lactone, tartaric acid, lactic acid, citric acid, malic acid, and mixtures thereof, together with an edible antimycotic;
   d. mixing the impregnated meat particles with hydrated acid stabilized expanded protein pieces, said expanded pieces being added in an amount of between about 25% to 90% by volume of the pet food product; and
   e. forming the mixture into a pet food product having a shear value of at least about 0.080 ft. lb/gram which is stabilized against subsequent bacterial and mycotic growth.

2. The process of claim 1 wherein the organic acid preservative is added in an amount of between about 0.5 and 3% by weight of the product.

3. The process of claim 1 wherein the edible antimycotic is selected from the group consisting of sorbic acid, salts of sorbic acid, propionic acid, salts of propionic acid, benzoic acid, salts of benzoic acid and mixtures thereof.

4. The process of claim 1 wherein the antimycotic is added in an amount of between about 0.15 and 0.3% by weight of the product.

5. The process of claim 1 wherein the ground raw meat is heated to a temperature of between about 165° to 175° F.

6. The process of claim 1 wherein the raw animal meat is ground into pieces with a size of between about ⅜ inch to ⅝ inch.

7. The process of claim 1 wherein the expanded protein pieces are acid stabilized by adjustment of the pH of the protein source to about 4.6 to 6.2 prior to expansion.

8. The process of claim 1 wherein an aliquot portion of said preservative composition is used to impregnate said meat particles and the balance of said preservative composition is used to acid stabilize said expanded protein pieces.

9. The product produced by the process of claim 1.

10. A process for the production of a pet food product having a moisture content exceeding about 40% with a shear value of at least about .080 ft. lb/gram and stabilized against bacterial and mycotic penetration comprising:
    a. grinding raw animal meat into particles of a substantially uniform size;
    b. heating the ground raw meat to a temperature sufficient to pasteurize the meat and reduce the bacterial contamination thereof;
    c. impregnating the heated meat particles with a preservative composition in an amount effective to inhibit bacterial and mycotic penetration in the pet food product, said preservative composition comprising a mixture of an acid salt selected from the group consisting of calcium acetate and sodium hexametaphosphate and an edible antimycotic;
    d. mixing the impregnated meat particles with hydrated expanded protein pieces in an amount of between about 25% to 90% by volume of the pet food product and
    e. forming the mixture into a pet food product having a shear value of at least about 0.080 ft. lb./gram which is stabilized against subsequent bacterial and mycotic growth.

11. The process of claim 10 wherein the edible antimycotic is selected from the group consisting of sorbic acid, salts of sorbic acid, propionic acid, salts of propionic acid, benzoic acid, salts of benzoic acid, and mixtures thereof.

12. The process of claim 10 wherein the antimycotic is added in an amount of between about 0.15 and 0.3% by weight of the product.

13. The process of claim 10 wherein the raw animal meat is ground into pieces with a size of between about ⅜ inch to ⅝ inch.

14. The process of claim 10 wherein the acid salt is added in an amount of between about 0.5 and 3% by weight of the product.

15. The product produced by the process of claim 10.

* * * * *

UNITED STATES PATENT AND TRADEMARK OFFICE
CERTIFICATE OF CORRECTION

PATENT NO. : 4,011,346
DATED : March 8, 1977
INVENTOR(S) : Thomas J. Ernst

It is certified that error appears in the above-identified patent and that said Letters Patent are hereby corrected as shown below:

Column 6, line 37, "amethaphosphate" should read --ametaphosphate--

Column 7, line 54, "hexamethaphosphate" should read --hexametaphosphate--

Column 8, line 36, delete "at"

Column 10, line 5, delete "-425" and insert -- -423 --

Column 13, line 57, "has" should read -- had --

Signed and Sealed this nineteenth Day of July 1977

[SEAL]

Attest:

RUTH C. MASON
Attesting Officer

C. MARSHALL DANN
Commissioner of Patents and Trademarks